Aug. 18, 1953      F. G. KELLY      2,649,078

GAS EXPANSION ENGINE

Filed April 4, 1951

Inventor
Frederick G. Kelly
By Henry Lanahan
Attorney

Patented Aug. 18, 1953

2,649,078

UNITED STATES PATENT OFFICE 2,649,078

GAS EXPANSION ENGINE

Frederick G. Kelly, West Orange, N. J., assignor to Thomas A. Edison, Incorporated, West Orange, N. J., a corporation of New Jersey Application April 4, 1951, Serial No. 219,210

6 Claims. (Cl. 121—123)

This invention relates to reciprocating gas engines and more particularly to reciprocating air engines of the expansion-chamber type.

Air expansion engines are used particularly in apparatus for liquefying air as in machines for producing oxygen from the atmosphere. In such machines the air is compressed and cooled to an extremely cold temperature of the order of −155° C., and is then passed through an air expansion engine coupled to a load device for the purpose of extracting energy from the air as it is expanded. Since the expansion is adiabatic, the stock of internal energy of the expanded gas is reduced and the temperature of the cold expanding air is lowered much further as the air is returned to atmospheric pressure.

It is an object of my invention to provide an improved reciprocating air expansion engine which is adapted particularly for use in small portable oxygen-generating equipment.

In air expansion engines of the reciprocating type, the exhaust port of the cylinder is closed and the intake port of the cylinder is thereupon opened as the piston nears the end of its return stroke. As the intake port is opened the compressed air rushes into the cylinder to drive the piston forwardly. When the piston has moved through about one-fifth of its forward stroke the inlet port is closed. Thereupon, further downward movement of the piston results in adiabatic expansion of the charge of compressed air taken in before closure of the inlet valve. At the end of the forward stroke the exhaust port is opened to allow escape of the remaining air in the cylinder and to permit unimpeded return of the piston. Typically, the piston is connected by a connecting rod to a crank shaft which in turn is connected to a constant-speed power-absorbing device such as to the compressor of the oxygen generator. With the return of the piston, one cycle of the engine is completed.

As far as is known, it has been the common practice to operate the valves of such a reciprocating air expansion engine by means of cams on the crank shaft and push rods operated by these cams and extending through packing glands into the valve and cylinder chambers. Such valve-operating cams are however complicated, bulky and expensive, and require frequent lubrication and servicing.

In accordance with my invention, I provide a simple valve mechanism actuated directly in response to the piston movement without the external operating cams and push rods and, accordingly, without the lubrication and servicing which the prior systems require.

It is accordingly a further object of my invention to provide an air expansion engine with an improved valve mechanism operated solely in response to piston movement to cause the cylinder to receive a definite gas charge on the receding stroke representing a substantial fraction of that stroke (of the order of 20%), to expand this charge substantially to the exhaust pressure, and to then clear substantially the whole cylinder of gas on the return stroke.

Another object of my invention is to provide an air expansion engine of the reciprocating type with an improved valve mechanism operated directly by piston movement and the air supply pressure.

More particularly, further objects of my invention are to provide an improved reciprocating gas expansion engine which is simple, compact and economical to build, and which will operate effectively over long periods with little servicing and maintenance requirements.

Other objects and features of my invention will be apparent from the following description and the appended claims.

In the description of my invention, reference is had to the accompanying drawings, of which:

Figure 5:
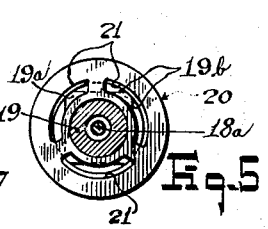
Figure 5 is a fractional view taken on the line 5—5 of Figure 1.

In the drawings, there is shown fractionally a gas expansion engine according to my invention having a vertically-disposed cylinder 10 provided with rim flanges 11 at the ends. Mounted on the upper rim flange and fitting internally the upper portion of the cylinder is a head 12 having therein a vertical intake port 13 provided at the top with a valve seat 14 of reduced diameter. Engaging this valve seat is a poppet valve 15 having an upper guide stem 16 slidably engaging a guide hole in a bracket 17 and having a depending stem 18 provided with an intermediate portion 18a of reduced diameter. A plunger 19 is slidably mounted on this reduced portion 18a and is confined thereon for limited movement relative to the poppet valve by the stop shoulders 18b and 18c at the ends of this reduced portion. The plunger has a head 19a slidably engaging the intake port and provided with four peripheral flats 19a (Figure 5) to allow flow of gas through the port. A bushing 20 is inset into the lower end of the intake port and aids in guiding the plunger, the bushing having apertures 21 therein (Figure 5) to allow free flow of gas through the intake port into the cylinder. Mounted on the top of the cylinder head is a valve housing 22 having therein a valve chamber 23 and a gas inlet 24 which is to be connected by suitable tubing 25 to a source of compressed gas (not shown). The poppet valve is urged upwardly by a cantilever spring 26, with a light pressure of the order of 40 grams, into a fully-open position defined by abutment of a collar 27 on the valve stem 18 against the bracket 17. However, the valve has sufficient effective area exposed to the inlet side that the normal differential pressure which is produced across the valve the instant the valve is closed will maintain the valve in closed position throughout the expansion stroke against the force of the biasing spring 26. Typically, the effective area of the valve is such that the inlet gas, when at a pressure of 150 pounds per square inch, will exert a force of 9 pounds against the valve.

Figure 1:
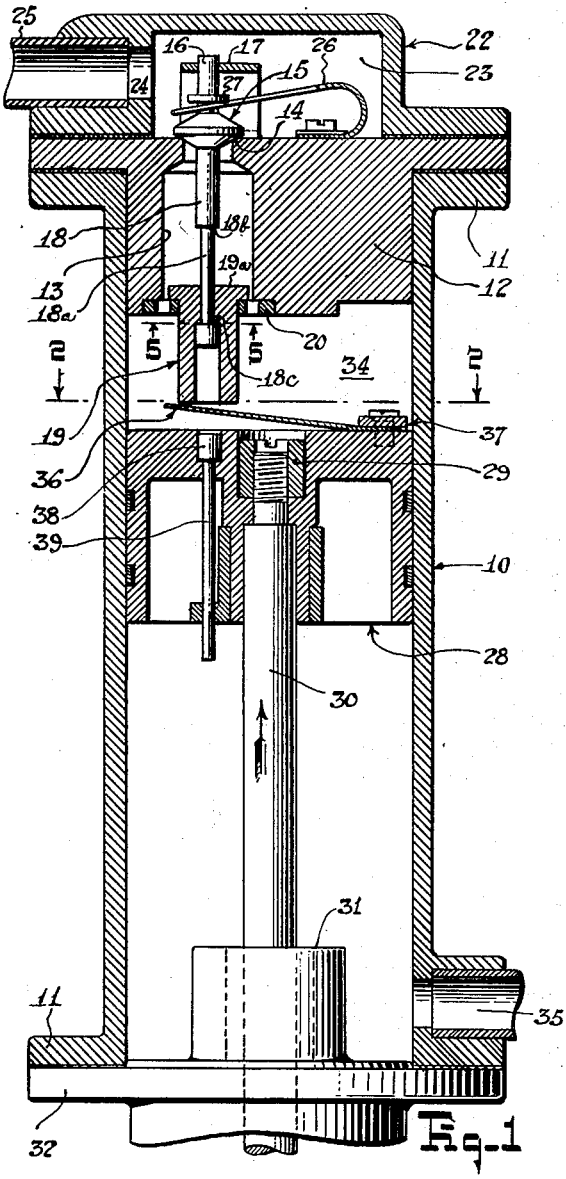
Figure 1 is a principally sectional view of an engine cylinder, piston and valve arrangement according to my invention, the parts being shown in the positions which they occupy as the piston nears the end of its return (exhaust) stroke.
Figure 3:
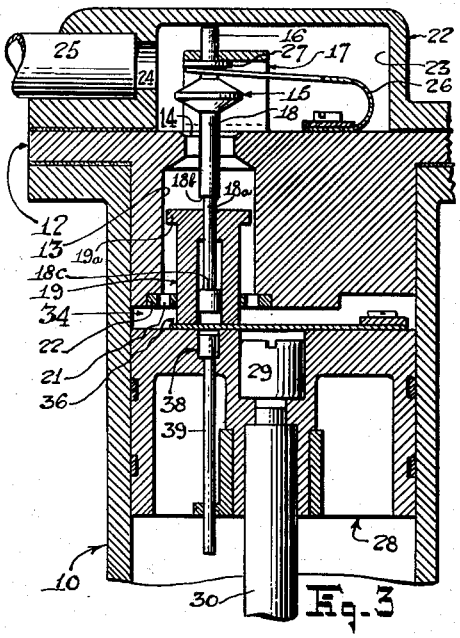
Figure 3 is a fractional sectional view similar to Figure 1 showing the valves in the positions they occupy when the piston is at the end of its return stroke.
Figure 4:
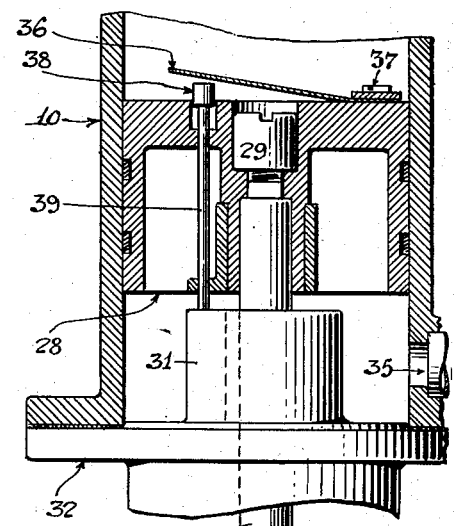
Figure 4 is a fractional sectional view similar to Figure 1 showing the piston at the end of its forward (expansion) stroke.
Figure 2:
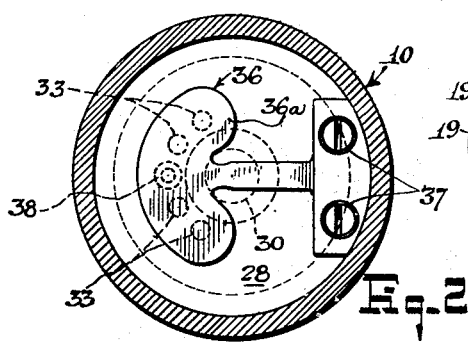
Figure 2 is a fractional sectional view taken on the line 2—2 of Figure 1.

Slidably fitting the cylinder is a piston 28 which is secured by a nut 29 to a piston rod 30. The piston rod extends beyond the lower end of the cylinder through a bearing 31. This bearing is part of a lower cylinder head 32 that is mounted on and secured to the bottom flange 11 of the cylinder. Extending through the piston is a series of exhaust ports 33 (Figure 2) to allow exhaust of the expanded gas in the cylinder chamber 34 during the return stroke of the piston, which exhaust gas leaves the cylinder via a side opening 35 at the lower end thereof. An exhaust valve 36 is mounted on the piston for closing the ports 33 during the forward stroke thereof. This exhaust valve is preferably in the form of a simple cantilever spring secured at one end, as at 37, to the top wall of the piston and having a lobe portion 36a at its other end which overlies the exhaust ports. The bottom face of this spring and the confronting face of the piston are ground flat and smooth so that when the spring is pressed downwardly it will close the exhaust ports without leakage. The exhaust spring is biased upwardly away from the piston into a normal "open" position, the position which it occupies in Figure 1. This biasing, like that of the poppet valve 15, is such that it is overcome by the normal differential pressure which exists across the valve during the expansion stroke. Typically, the valve may be so designed that a differential pressure across it of four pounds per square inch or more will hold it closed. Thus, as soon as the exhaust valve is closed, it will be retained in that position until the differential pressure across it falls to four pounds per square inch or until the valve is forcibly opened, as will appear.

Although the upward bias of the exhaust spring is overcome by the normal differential pressure across the valve during the expansion stroke, it is sufficient to lift the weight of the plunger 19 during the return stroke but is insufficient to overcome the normal differential pressure exerted across the intake valve 15.

In the event the cylinder pressure has not fallen sufficiently to cause the exhaust valve to open by the time the piston reaches a point, say $\tfrac{1}{10}''$, from the far end of the expansion stroke, the exhaust valve is forcibly opened in the remaining portion of the expansion stroke of the piston. The means for accomplishing this comprises a plunger 38 below the exhaust valve having a stem 39 slidably mounted in the piston and extending beyond the lower end thereof. As the piston nears the end of its expansion stroke the stem 39 impinges against a stationary abutment formed by the bearing 31 to force the plunger upwardly wherefore to lift the exhaust valve from the top face of the piston. Once the exhaust valve is lifted from the piston the pressure on the top and bottom sides thereof is equalized and the valve is responsive then only to its normal bias.

The operation of the above described expansion engine is as follows: During the return stroke of the piston 28, the parts are in the positions they occupy in Figure 1—i. e., the intake valve is held closed by the pressure of the gas supply at the inlet side of the valve, and the exhaust valve 36 is held open by its normal bias. During the end portion of the return stroke the exhaust valve 36 impinges against the plunger 19 and raises it into contact with the shoulder 18b without effecting closure of the exhaust valve. However, immediately thereafter the exhaust valve is closed by the continuing upward movement of the piston since the downward thrust exerted on the poppet valve is much greater than the upward bias of the exhaust valve. As soon as the exhaust valve is closed, the piston exerts a positive upward thrust on the poppet valve 15 to lift it from its valve seat 14. As soon as the intake valve is unseated, the pressure is equalized on its upper and lower sides and the valve is raised fully open by the spring 26.

As soon as the intake valve is opened the highly-compressed air of the air supply rushes through the intake port 13, past the plunger 19 and through the holes 21 in the bushing 20, into the expansion chamber 34 to exert a downward driving thrust on the piston. This inrushing gas exerts insufficient force on the intake valve to close it against the biasing force of the spring 26. It does however exert a considerable force on the head of the plunger 19. This force, together with that produced by the weight of the plunger, is first taken up by the piston but is transmitted to the intake valve the instant the plunger is lowered sufficiently by the receding piston to cause it to bear against the shoulder 18c on the valve stem 18. Since this force is more than sufficient to overcome the bias of the spring 26, the intake valve is closed the instant the piston leaves contact with the plunger.

With the closing of the intake valve, a charge of high-compression gas is captured in the expansion chamber 34. This gas charge continues to drive the piston forwardly by expansion thereof and in doing so a differential force is developed across the intake valve to hold it closed during the expansion stroke. The piston rod is connected to a crank shaft and the crank shaft is in turn connected to some constant-speed power-consuming device as aforementioned, but such device need not be herein shown. However, because external work is done by the expanding gas, its stock of internal energy is reduced and its temperature is lowered much more than it would be by expansion alone through a nozzle.

At the end of the forward stroke, the exhaust valve is opened either in response to the fall of differential pressure thereacross or by impingement of the stem of the plunger 38 against the abutment 31, to allow immediate release of any remaining pressure in the expansion chamber. During the return stroke this exhaust valve remains open to allow residual gas in the expansion chamber to escape via the exhaust ports 33 and the outlet opening 35. This return of the piston will be effected by the drive connection to the power-absorbing and speed-controlling means for the engine to which the piston is connected.

Typical values for a gas expansion engine suitable for a small oxygen generator may be as follows: the piston may have a stroke of the order of 2¼", the exhaust valve is closed and the intake valve is immediately thereafter opened when the piston is 3/16" from the cylinder head 12 and ⅛" from the end of its stroke, and the intake valve is closed when the piston has been driven forwardly through approximately 20% of its stroke. These valves are however only illustrative and no unnecessary limitation thereto is intended.

The embodiment of my invention hereinabove described is intended to be illustrative and not necessarily limitative of my invention, since the same is subject to changes and modifications without departure from the scope of my invention, which I express according to the following claims.

I claim:

1. A gas expansion engine comprising a cylinder having a head at one end provided with an intake port, a piston movable in said cylinder, a poppet valve for said intake port normally held closed by the gas inlet pressure and having a stem projecting towards said piston, a plunger slidably mounted on said stem and having an inner portion partially closing said intake port and an outer portion extending into said cylinder into the path of said piston, a stop element on said stem engaged by said plunger in the end portion of the return stroke of said piston for positively opening said intake valve, means for yieldably holding said intake valve open, and means for closing said intake valve during the forward stroke of said piston comprising a second stop element on said stem engaged by said plunger under pressure of the inrushing gas thereagainst as the piston in its forward stroke leaves contact with the plunger.

2. The gas expansion engine set forth in claim 1, including an exhaust valve mounted on said piston, means biasing said exhaust valve relative to said piston towards said cylinder head into open position, said exhaust valve being positioned on said piston for abutment against said plunger as the piston nears the end of its return stroke, and said exhaust valve being biased open with a lesser force than that exerted by the inlet gas on said intake valve whereby said exhaust valve is closed as an incident precedent to the opening of said intake valve.

3. The gas engine set forth in claim 2 wherein said exhaust valve has an effective area of exposure to the gases in said cylinder adapted to hold the valve closed against its bias force during the expansion stroke of said piston.

4. A gas expansion engine comprising a cylinder having a head at one end provided with an intake port, a piston movable in said cylinder, a valve for said intake port normally held closed by the gas inlet pressure, an exhaust port extending through said piston, a valve for said exhaust port, means biasing said exhaust valve into open position with a force less than the differential pressure exerted normally on said intake valve when the valve is closed, and means coupled to said intake valve and adapted to abut against said exhaust valve to cause the latter to be closed by the inlet pressure on the former as said piston nears the end of its stroke towards said cylinder head.

5. A gas expansion engine comprising an upright cylinder having a head at its upper end provided with a vertical intake port, said port having a valve seat at its upper end, a piston movable in said cylinder, a poppet valve for said intake port adapted to be held closed against said seat by the gas inlet pressure and having a vertical stem projecting towards said piston, a plunger slidably mounted on said stem and having an upper portion partially closing said intake port and a lower portion extending into said cylinder, a vertical exhaust port extending through said piston, an exhaust valve cooperating with said exhaust port and biased upwardly relative to said piston into open position with a force greater than the weight of said plunger and less than the normal force of the gas inlet pressure on said intake valve, said exhaust valve being aligned with said plunger for lifting the latter as said piston is moved upwardly into an end portion of its forward stroke, a stop element on said stem for said plunger engaged by the plunger as it is lifted by said exhaust valve for forcing the exhaust valve closed and thereupon forcing the intake valve open as said piston is moved to the end of its upward stroke, a spring acting on said intake valve to raise it to a fully-open position as soon as the intake valve is disengaged from said seat, a second stop element on said stem engaged by said plunger wherefore to close said intake valve as said exhaust valve leaves contact with the plunger in the downward stroke of the piston, said exhaust valve being adapted to be maintained closed against its biasing force by the internal gas pressure in said cylinder during the downward stroke; and stationary means to force open said exhaust valve at the end of the downward stroke of said piston.

6. In a gas expansion engine: the combination of a cylinder having a head at one end provided with an intake port, a piston movable in said cylinder, a valve for said intake port biased open and urged normally into closed position by the gas inlet pressure, a stem connected to said valve and movable in the direction of said piston, said stem extending into the path of the piston for engagement thereby as the piston moves to the end portion of its return stroke, a plunger slidably mounted on said stem and having an inner portion partially closing said intake port and an outer portion extending into the path of said piston, means to cause positive opening of said intake valve by said piston as the piston moves through the end portion of its return stroke, and means for closing said intake valve during the forward stroke of said piston comprising a stop element on said stem engaged by said plunger under pressure of the inrushing gas thereagainst as the piston in its forward stroke leaves contact with the plunger.

FREDERICK G. KELLY.

References Cited in the file of this patent

UNITED STATES PATENTS

| Number | Name | Date |
|---|---|---|
| 437,097 | Coffield | Sept. 23, 1890 |
| 669,290 | Stoer | Mar. 5, 1901 |
| 2,098,936 | Armstrong et al. | Nov. 16, 1937 |

FOREIGN PATENTS

| Number | Country | Date |
|---|---|---|
| 889,677 | France | Oct. 11, 1943 |